E. SOPER.
Side-Bar and End-Spring Connections for Vehicles.
No. 157,551. Patented Dec. 8, 1874.

WITNESSES:
A Bennewendorf
Alex F. Roberts

INVENTOR:
E. Soper
BY
ATTORNEYS.

UNITED STATES PATENT OFFICE.

EPHRAIM SOPER, OF BROOKLYN, E. D., NEW YORK.

IMPROVEMENT IN SIDE-BAR AND END-SPRING CONNECTIONS FOR VEHICLES.

Specification forming part of Letters Patent No. 157,551, dated December 8, 1874; application filed November 7, 1874.

*To all whom it may concern:*

Be it known that I, EPHRAIM SOPER, of Brooklyn, E. D., in the county of Kings and State of New York, have invented a new and Improved Side-Bar Coupling for Carriages, of which the following is a specification:

My invention consists of a flexible coupling of leather, rubber, or other equivalent substance, arranged in the form of a strap, attached to the bar and looped or doubled around the bolt of a clip attached to the spring for coupling the side bar to the spring, so that the torsion caused by the lengthening and shortening of the spring will be expended on the flexible coupling, and thus the bars will be free to work without being exposed to the torsion to which they are subject when clipped directly to the springs, as in the common way, and which soon splits and destroys the bars.

Figure 1:
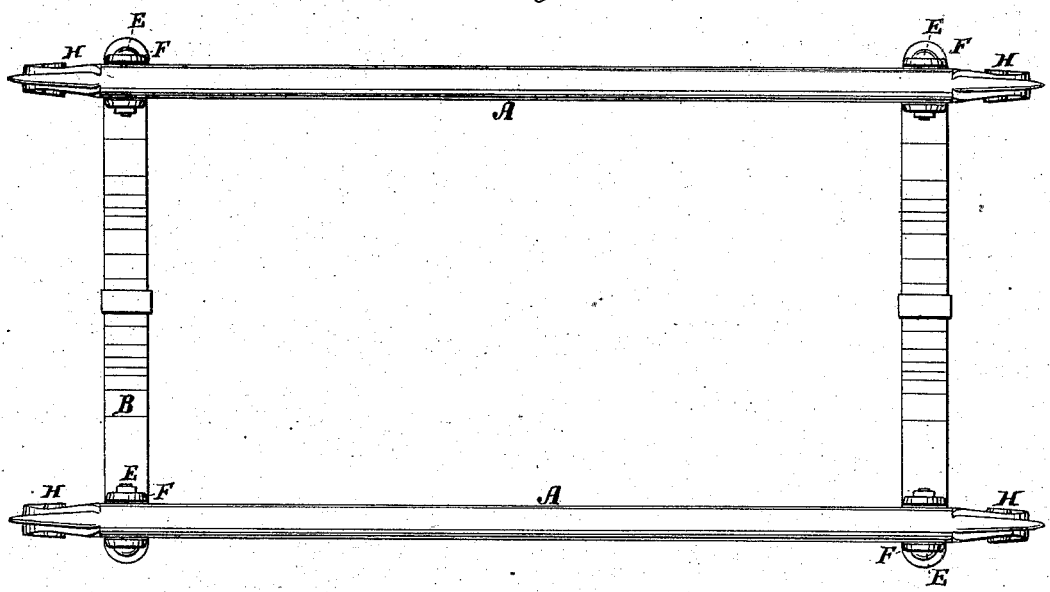
Figure 2:
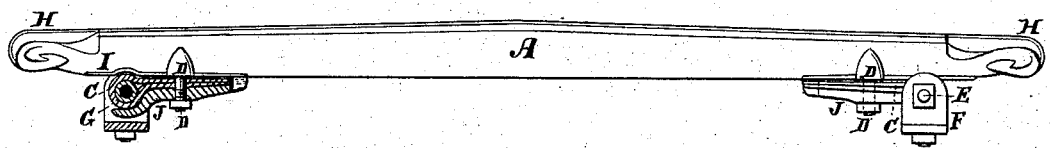
Figure 3:
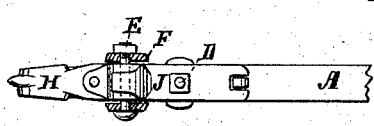

Figure 1 is a plan of a set of side bars and springs coupled according my invention. Fig. 2 is a side view, showing one coupling in section. Fig. 3 is a plan of the coupling inverted, and Fig. 4 is a side elevation and section of a modified arrangement.

Similar letters of reference indicate corresponding parts.

A represents the side bars, B the springs, and C the flexible couplings. The couplings may consist of a short strap for each, as in Figs. 1, 2, and 3, or a long one, as in Fig. 4, extending the whole length of the side bar, and forming two couplings. In either case it is bolted to the under side of the side bar at D, and doubled around the pin E of a clip, F, mounted on the top of the spring B. A bushing, G, of rubber, is fitted on the bolt of the clip for a cushion, and to protect the coupling from wear by the bolt; and it may have a metal thimble to protect it.

Figure 4:
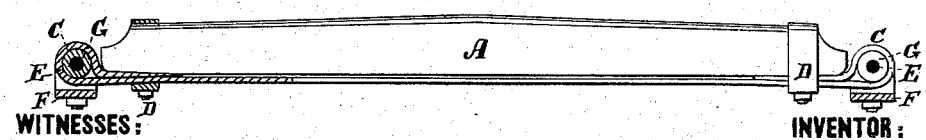

The side bar may extend beyond the coupling and have the usual finish, H, as in Figs. 1, 2, and 3; or it may terminate at the side of the spring, as in Fig. 4. In the former case the bar will have a bearing-plate, I, of brass or other substance, and rest on the coupling, and a hook-plate, J, will be arranged on the bar to extend under the bolt of the clip to prevent the bar from being thrown up, so as to fall back and strike and pound on the coupling and make a noise.

The bearing-plate will be a little convex transversely to allow the coupling to oscillate freely under the bar as the spring causes it to shift by bending up and down.

When the couplings are formed of a single strap, extending the whole length of the bar, it will be strained taut to serve as a tension-chord to the bar.

Having thus described my invention, I claim as new and desire to secure by Letters Patent—

1. The side bars A, coupled to the springs B by flexible couplings C, of leather, and a clip, E F, substantially as specified.
2. The combination of the rubber bushing G with the coupling C and the rod E of the clip, substantially as specified.
3. The combination of the hook-plate J with the side bar, flexible coupling, clip E F, and spring B, substantially as specified.

EPHRAIM SOPER.

Witnesses:
T. B. MOSHER,
C. SEDGWICK.